United States Patent [19]
Jorritsma

[11] Patent Number: 5,190,442
[45] Date of Patent: Mar. 2, 1993

[54] ELECTRONIC PUMPCONTROL SYSTEM

[76] Inventor: Johannes N. Jorritsma, 37 Yonge Street N., Aurora, Ontario, Canada, L4G 1N6

[21] Appl. No.: 755,646

[22] Filed: Sep. 6, 1991

[51] Int. Cl.$^5$ .............................................. F04B 41/06
[52] U.S. Cl. .......................................... 417/7; 417/12; 417/19; 417/20; 417/38; 417/43
[58] Field of Search ...................... 417/2, 3, 4, 5, 6, 7, 417/8, 12, 18, 19, 20, 36, 38, 43

[56] References Cited

U.S. PATENT DOCUMENTS

| | | | |
|---|---|---|---|
| 2,246,940 | 6/1941 | Hood | 417/43 |
| 3,247,864 | 4/1966 | Conery | 417/7 |
| 4,341,983 | 7/1982 | Gottliebson | 417/7 |
| 4,705,456 | 11/1987 | Gardeen | 417/7 |

Primary Examiner—Richard A. Bertsch
Assistant Examiner—David W. Scheuermann
Attorney, Agent, or Firm—Shoemaker and Mattare, Ltd.

[57] ABSTRACT

A sewage pumping system includes a container, an inlet for the inflow of liquid and a modality for ascertaining the liquid level in the container. Two or more pumps are provided, each having an inlet communicating with a container and an outlet communicating with the common conduit. A pump controller receives information from the modality for ascertaining the liquid level and is adapted to start and stop individual pumps. A pressure sensing device is located in the conduit for sensing the backpressure against which pumps in operation are pumping, and for generating a second signal corresponding to the sensed backpressure, the signal going to the pump controller. An addressable memory is operatively connected with the pump controller and stores values corresponding to pumping rates vs. backpressure for each of the pumps, along with high and low backpressure values for each pump. On high backpressure the pump controller avoids pumpstarts which will not result in a net increase in the total pumping rate. On, on a decrease in backpressure, the pump controller allows more pumps to start when called for, and allows for the starting of more pumps than the minimum necessary, in order to decrease the duration of pumping. Controller avoids pumpstarts under conditions which, given the stored high and low backpressure values for the respective pump, would result in the pump undergoing rapid on/off cycling. Finally, the pump controller avoids starting and stopping pumps on pressure surges by delaying any action for a given time period which is longer than the duration of a typical pressure surge.

22 Claims, 2 Drawing Sheets

ELECTRONIC PUMPCONTROL SYSTEM

This invention relates generally to electronic pump-control systems, and has to do particularly with a system of that type containing improvements that provide a more energy-efficient operation, even wear on the pumps, the avoidance of energy and pressure surges and accurate calibration.

The system presented herein is particularly advantageous for controlling sewage pumping stations used in urban sewage systems, although it is by no means restricted to such systems.

BACKGROUND OF THIS INVENTION

A typical system to which this invention applies is one involving a wet well that more or less continuously receives liquid (such as sewage) at an inlet location, and having two or more separate pumps each drawing liquid from the wet well, and each pumping into a common manifold or conduit. It is well known that, if the backpressure into which a pump is pumping is too high, the pump will lose its pumping capability. Similarly, where one or more pumps are already pumping into a common conduit, from this pump station or any other pump station in the system (conduit), causing a backpressure at a certain level, it is possible that the start of a further pump from this pump station or any other pump station in the system will so increase the backpressure that there will be no effective increase in the total pumping capacity.

A further disadvantage of conventional systems utilizing two or more pumps lies in the fact that, depending upon how the pump selection is configured, one of the pumps may be operated for a much greater percentage of the total time than another of the pumps.

A still further disadvantage of conventional systems arises when there is an electric power failure. When the electric power is restored the logic may call for one or more or all of the pumps to start simultaneously, and this will create a sudden pressure surge in the form of backpressure. Part of the solution to the first problem set out above is to program a memory with high and low values for each pump, which will cancel a called-for pumpstart if the backpressure is too high, or will turn off a pump if the backpressure rises beyond the "high" value for that pump stored in memory. In the event of a sudden backpressure surge upon restoration of electrical energy after energy failure, the surge could trigger the pumps to be turned off, and this would initiate an on-off cycle which would be very damaging to the system.

A further disadvantage of conventional systems is the lack of an accurate measurement of inflowing liquid, particularly when the system is operating at or near its top capacity.

A final disadvantage of present sewage pumping systems deserves mention. Since pumps start at random, it can happen that all pump stations on the same force main are called to pump simultaneously. They then pump into a high backpressure and the treatment plant receives a large volume of sewage which interferes with the treatment process and will result in an unnecessarily high electricity consumption because of the high backpressure. Due to these disadvantages, many engineers specify the use of the very expensive variable speed pump.

GENERAL DESCRIPTION OF THIS INVENTION

The present invention provides particular structure which addresses all of the problems set forth above, and provides workable solutions.

More particularly, this invention provides, in a pumping system which includes a container for liquid, an inlet for the inflow of liquid entering the container, means for ascertaining the liquid level in said container and for generating a first signal corresponding to the current level, a plurality of pumps each having an inlet communicating with the interior of the container and an outlet communicating with a common conduit for liquid being pumped out of the container, and a pump controller for receiving said first signal and for starting and stopping individual pumps, the improvement comprising:

pressure sensing means in said conduit for sensing the backpressure against which pumps in operation are pumping and for generating a second signal corresponding to said sensed backpressure, the pump controller receiving said second signal, the provision, operatively connected to the pump controller, of an addressable memory for storing values corresponding to pumping rates vs. backpressure for each of said pumps, along with high and low backpressure values for each pump, and processor means operatively connected to the pump controller, the processor means being programmed such that:

(a) on high backpressure, the pump controller avoids pumpstarts which will not result in a net increase in the total pumping rate;

(b) on a decrease in backpressure, the pump controller allows more pumps to start when called for, and allows for the starting of more pumps than the minimum necessary, in order to decrease the duration of pumping;

(c) the pump controller avoids a pumpstart under conditions which, given the stored high and low backpressure values for the respective pump, would result in the pump undergoing rapid on/off cycling;

(d) the pump controller avoids the starting and stopping of pumps on pressure surges, by delaying any action for a given time period longer than the duration of a typical pressure surge.

Further, this invention provides a pumping system, comprising:

a container for liquid, an inlet for the inflow of liquid entering the container, means for ascertaining the liquid level in said container and for generating a first signal corresponding to the current liquid level, a conduit for liquid being pumped out of the container, a plurality of pumps each having an inlet communicating with the interior of the container and an outlet communicating with said conduit, pressure securing means in said conduit for sensing the backpressure against which pumps in operation are pumping and for generating a second signal corresponding to said sensed backpressure, a pump controller for receiving said first and second signals and for starting and stopping individual pumps, an addressable memory operatively connected to said pump controller, means for storing, in said addressable memory, values corresponding to pumping rates vs. backpressure for each of said pumps, along with high and low backpressure values for each pump, and processor means operatively connected to the pump controller, the processor means being programmed such that:
  (a) on high backpressure, the pump controller avoids pumpstarts which will not result in a net increase in the total pumping rate;
  (b) on a decrease in backpressure, the pump controller allows more pumps to start when called for, and allows for the starting of more pumps than the minimum necessary, in order to decrease the duration of pumping;
  (c) the pump controller avoids a pumpstart under conditions which, given the stored high and low backpressure values for the respective pump, would result in the pump undergoing rapid on/-off cycling;
  (d) the pump controller avoids the starting and stopping of pumps on pressure surges, by delaying any action for a given time period longer than the duration of a typical pressure surge.

Still further, this invention provides a pumping system, comprising:
  a container for liquid,
  an inlet for the inflow of liquid entering the container,
  means for ascertaining the liquid level in said container and for generating a signal corresponding to the current liquid level,
  a conduit for liquid being pumped out of the container,
  a plurality of pumps each having an inlet communicating with the interior of the container and an outlet communicating with said conduit,
  a pump controller for receiving said signal and for starting and stopping individual pumps so as to maintain the liquid level between predetermined upper and lower limits,
  an open channel flow metering device in said inlet, the flowmeter generating a further signal corresponding to the liquid volume inflow to the said container,
  a processor means operatively connected to said pump controller,
  an addressable memory operatively connected to said pump controller,
  the processor means being programmed so as to assign, to different levels of said further signal, different empirically calculated average liquid volume inflow rates computed on the basis of:
    (a) a known container volume between a lower and an upper level within the container, and
    (b) the length of time required for the liquid surface in the container to rise from the lower to the upper level when no pumps are pumping,
  the processor means storing such assigned rates in said addressable memory, the processor means further including an extrapolation and interpolation capability whereby, during periods of high inflow when the liquid level remains high despite the running of all pumps, the processor means can estimate inflow on the basis of said third signal and the memorized assigned rates in the addressable memory.

GENERAL DESCRIPTION OF THE DRAWINGS

One embodiment of this invention is illustrated in the accompanying drawings, in which:

FIG. 1 is a schematic vertical sectional view through a pumping station, illustrating certain aspects of this invention; and FIG. 2 is a logic-flow diagram, showing the sequential selection steps by which this invention operates.

DETAILED DESCRIPTION OF THE DRAWINGS

A first aspect of this invention involves a system which receives a signal corresponding to the pressure on the downstream side of the pumps in a pumping system, i.e. the backpressure into which the pumps are pumping. In accordance with this invention, a pump controller is operatively connected to an addressable memory which can be programmed by the user with values corresponding to pump capacities vs. backpressure so as to avoid pumpstarts (for example initiated by a level sensor) into a high backpressure which will not cause an effective increase in pumping capacity when the additional pump starts up. Conversely, upon a decrease in backpressure, the system will allow pumpstarts when the pump controller and level sensors call for more pumps to run. Thus, the system allows for a more energy efficient pumping arrangement, which avoids unnecessary wear on pumps.

The user values to be programmed into the addressable memory are typically taken from pump manufacturer data sheets, or from empirically established values for the pumps. Also programmed into the addressable memory are upper and lower values for each pump, establishing the limits of a backpressure range within which the particular pump would not be permitted to start, thus eliminating a pump start-up that would give rise to an increase in backpressure, sufficient to cause the same pump to stop again, and so on in a cycling manner. The addressable memory would also contain values for time-delayed action to avoid starting and stopping pumps on pressure surges which are caused by the starting and stopping of the pumps in the system or by other sources, for example other pumping stations in the same pressure system.

This improvement can be carried out by adding a pressure sensing device to the system downstream of the pumps, the device sending a signal to the pump controller. Also required is associated software to execute the requirements for a particular application.

Figure 1:
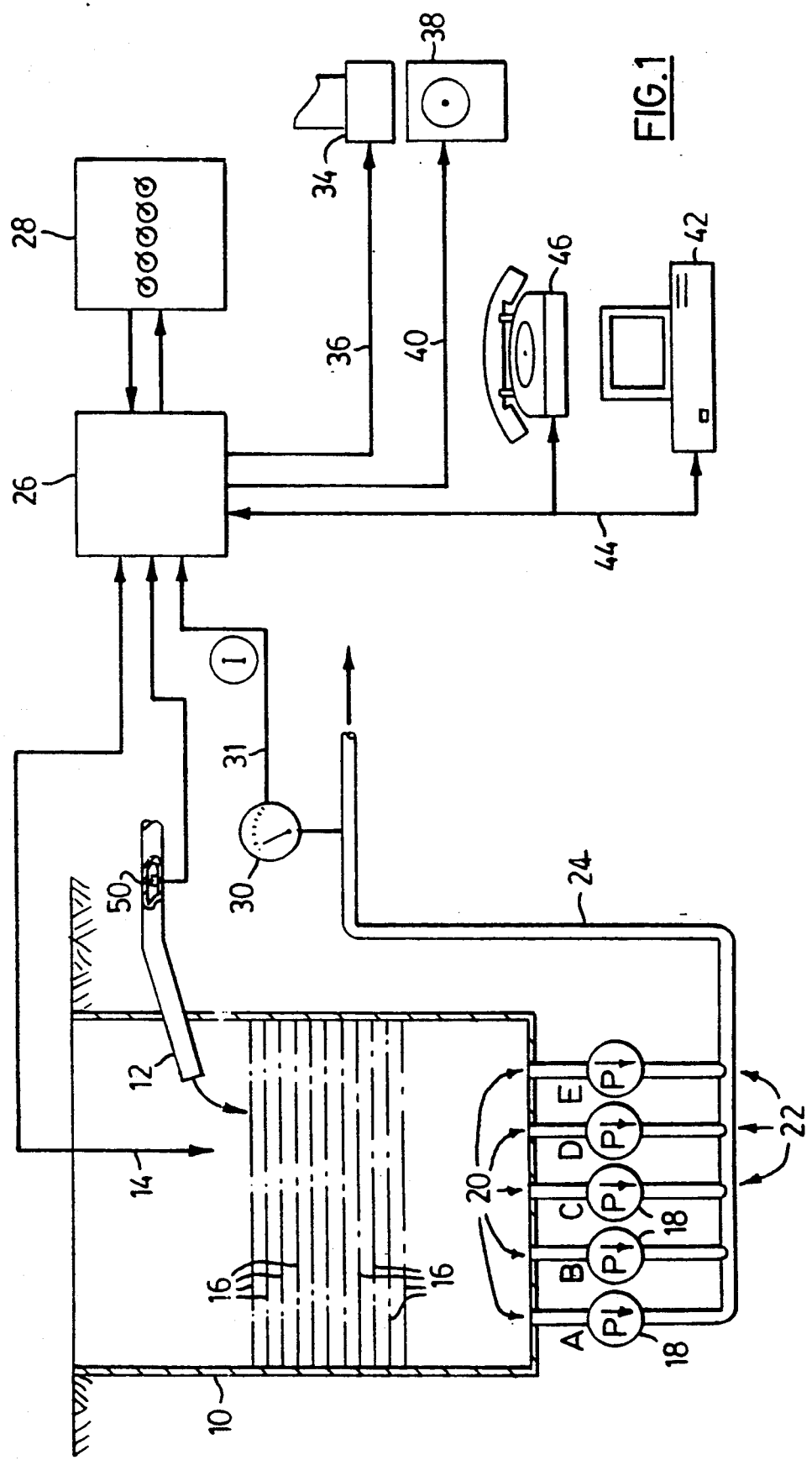

Attention is directed to FIG. 1, which shows a container 10 for liquid, and inlet 12 for the inflow of liquid entering the container 10, and means for ascertaining the liquid level in the container 10 and for generating a first signal corresponding to the current liquid level. In FIG. 1 this is illustrated by the vertically downward arrow 14 and the plurality of horizontal lines 16 representing various different operating levels which determine the start, stop and alarm conditions which are required for installations of this kind. Because this kind of apparatus is well known, it is not necessary to illustrate or describe specific modalities beyond indicating that they can include float switches, bubble pressure means and sonar devices.

Also provided in FIGS. 1 (and shown schematically) is a plurality of pumps 18 each having an inlet 20 communicating with the interior of the container 10, and each having an outlet 22 communicating with a common conduit 24 for liquid being pumped out of the container 10.

FIG. 1 further shows a pump controller 26 for receiving the first signal (from the sensor 14), and for starting and stopping individual pumps 18. A pump starting device, with a manual override control, is illustrated at 28.

This invention involves the provision of a pressure sensing means, shown as a pressure gauge 30 in FIG. 1, located in the conduit 24 for sensing the backpressure against which the pumps 18 in operation are pumping, and for generating a second signal corresponding to the sensed backpressure. The pump controller 26 receives the second signal along the line 31 in FIG. 1.

This invention further provides processor means operatively connected to the pump controller 26 (in the FIG. 1 embodiment, the processor means is an integral part of the pump controller 26). The processor means is programmed such that:

(a) on high backpressure, the pump controller avoids pumpstarts which will not result in a net increase in the total pumping rate;

(b) on a decrease in backpressure, the pump controller allows more pumps to start when called for, and allows for the starting of more pumps than the minimum necessary, in order to decrease the duration of pumping;

(c) the pump controller avoids a pumpstart under conditions which, given the stored high and low backpressure values for the respective pump, would result in the pump undergoing rapid on/off cycling;

(d) the pump controller avoids the starting and stopping of pumps on pressure surges, by delaying any action for a given time period longer than the duration of a typical pressure surge;

(e) If the backpressure in the system remains too high too long, or when erroneous values are programmed into the processor means, a level contact is used, to override the "no-start" signal, thus avoiding the overflowing of the wet well.

To the right in FIG. 1 is shown a digital reporting facility 34 operated by the pump controller 26 along the line 36, an analog recording modality 38 controlled by the pump controller 26 along the line 40, and a remote computer 42 interacting with the pump controller 26 along the line 44 and adapted to receive information relating to other possible pumping stations or conditions which can affect pressure or flow, in order to delay pump starts and/or cause premature pump starts, in order to even out the flow to the treatment plant and reduce the energy consumption of the system by delivering pumped material into the lowest possible average backpressure. A two-way communication is also presented at 46.

In accordance with a further aspect of this invention, the system ensures that all of the pumps in a multi-pump system are run for roughly the same percentage of time. More specifically, when a signal from the level detection system (arrow 14) is received and the pump controller must start a pump, it selects the pump with the lowest cumulative pump running time. Similarly, on a signal to stop a pump (when more than one is running) the pump controller 26 stops the pump with the highest pump running time. This is carried out each time a pump stops or starts. Internal pump timers in the pump controller are continuously updated when the pumps are running either in an automatic mode or in a manual (hand start) mode, and from these totalized values the decision is made to start or stop a pump. The internal timer values for the different pumps can be displayed on an LCD display (or similar display), thus eliminating the need for additional pump running timers in the pump control panel.

To summarize this further aspect, pump timers are operatively connected to the pump controller 26 for continuously storing the total cumulative running time for each of the pumps 18, and the processor means mentioned earlier is programmed such that, when the pump controller is required to start a pump, it always selects the non-running pump with the least cumulative running time among all of the non-running pumps. Alternatively, when the pump control is required to stop a pump, it always selects the running pump with the greatest cumulative running time among all of the running pumps.

A further aspect of this invention relates to a particular operational sequence responding to electrical power failure. Briefly, upon return of electric power either from hydro or from a stand-by-generator, the pump controller will not start all required pumps simultaneously, because this would result in a backpressure surge and an energy demand spike. Instead, the processor means described earlier is programmed such that, upon the occurrence of an electric power failure during conditions in which the pump controller would normally require two or more pumps to be running, the pump controller, upon the return of an electric power, starts the required pumps in a predetermined sequence rather than simultaneously, with a predetermined time delay between sequential pumpstarts, thereby minimizing electrical current surges and backpressure surges.

The foregoing features eliminate the need for extensive time delay relay configurations which are costly, prone to wear and tear, and difficult to make adjustments to when needed. Further, they require extensive space in the control panel.

All of the features thus far described can work in combination with the software to also measure inflow and outflow for the container 10. Modem control can be provided, to enable operators to make changes in the setting of various parameters from a remote location. The connection to a remote computer also allows the operator to override pumpstarts and pump stops in order to provide a more even flow to the treatment plant or the like, in conjunction with conditions in other pumping stations. This feature will reduce the time during which pumps in various parts of a larger system are all pumping at the same time, since this could cause an increase in the overall backpressure, thus affecting the overall performance of the system, especially energy savings.

The final aspect of this invention is one which can fine-tune the measurement of inflowing liquid into the container. It will be understood that, when all pumps are pumping continuously during a peak inflow period, the usual method of determining throughput or inflow is not available. This "usual method" works only under moderate flowrates where the full pumping capacity is able to lower the level within the wet well (container 10) to a predetermined lower limit which calls for the pumps to be turned off. Then, liquid runs into the container 10 gradually filling it up to an upper limit level, at which the pump controller calls for one or more pumps to start. The time taken for the liquid level to rise from the lower limit to the upper limit is used to determine the average inflow rate during that period, since the volume of the container 10 between the lower limit and the upper limit can be known with considerable accuracy.

However, under the conditions mentioned earlier (all pumps running and the liquid level in the container 10 not dropping), the use of an "off the shelf" open channel flow meter which mechanically or electronically measures the inflow rate is unlikely to produce a satisfactory reading when the container 10 is the wet well of a sewage system, and raw sewage is entering the wet well past the flow meter. It is known that the conventional flow meter works best in a primary device and in clean water, and that solids and raw sewage in the liquid can foul the device and produce an incorrect reading.

The typical flow meter under discussion produces an analog signal corresponding to the flow. The final aspect of this invention is one which is able to assign a more accurate interpretation to the signal received from the flow meter, when the same is installed in a conduit through which raw sewage or the like is flowing. In FIG. 1, the flow meter is shown at 50 in the inlet 12.

To accomplish this final aspect of the invention, the processor means associated with the pump controller 26 is programmed so as to assign, to different levels of the signal provided by the flow meter 50, empirically calculated average liquid volume inflow rates computed on the basis of:

(a) a known container volume between a lower and an upper level within the container, and
(b) the length of time required for the liquid surface in the container to rise from the lower to the upper level when no pumps are pumping.

The processor means stores such assigned rates in the addressable memory mentioned earlier, and the processor means further includes an extrapolation and interpolation capability whereby, during periods of high inflow when the liquid level remains high despite the running of all pumps, the processor means can estimate inflow on the basis of said flow meter signal and the memorized assigned rates in the addressable memory. In other words, this aspect of the present invention simply provides a reliable calibration of the signal generated by the flow meter 50.

It will be understood that this calibration of the flow meter can be carried out continuously or on a regular basis, thus taking into account any diurnal change in the nature of the sewage entering the wet well (for example an increase or decrease in solids).

The calibration just mentioned must, of course, be carried out during a period of low flow. During this low flow period, the pump rate for each pump can also be established. This established value can be compared with the pre-programmed value and if there is a serious discrepancy (i.e. the found value is substantially lower than the pre-programmed value), then the pump is not working to its capacity, provided the backpressure is still within normal limits. The actual pump capacity can be displayed as a percentage of the preprogrammed value. Further, the pump under consideration can be automatically taken out of operation, or can be placed to the last lag pump position, and a report or alarm can be initiated for the operator of the station to follow up at his convenience.

Figure 2:
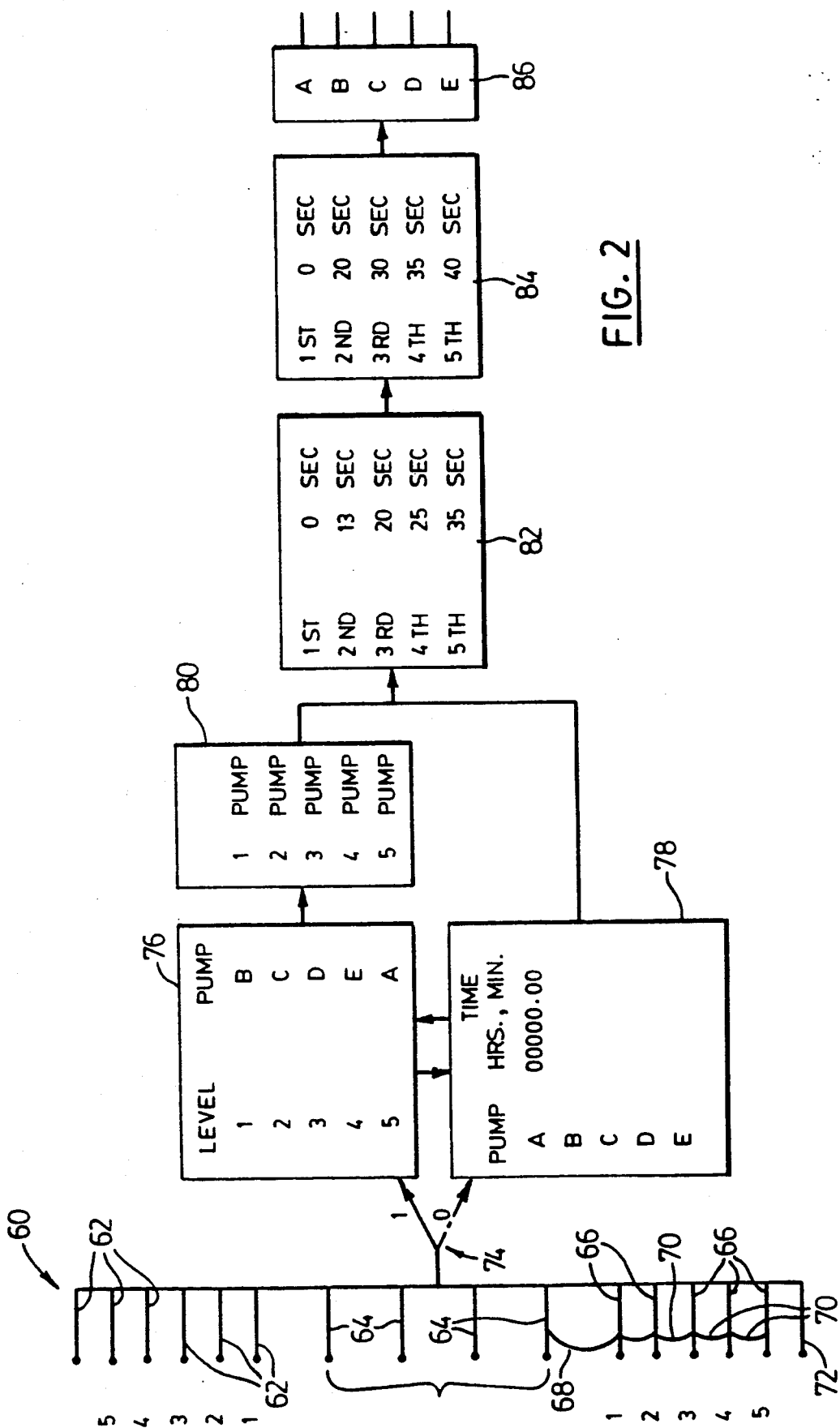

In the schematic logic diagram of FIG. 2, the selections or choices progress from left to right.

The scale 60, located at the far left, indicates what should happen at the various levels in the wetwell. It represents terminals that can be connected to the wires from various float switches, and consists of an analog or digital device. The uppermost level is an alarm level which indicates high water resulting from lack of pumping or very high inflow.

The upper lines 62 represent elevations at which pumps should start. The actual pump or pumps that start are determined later in FIG. 2. In the case of only two pumps, contacts 1 and 2 are utilized.

Toward the middle of the scale 60, lines 64 are used for flow metering purposes. The lower five lines 66 represent levels where pumps should stop. The numeral 68 designates a jumper connecting the lowest level 64 with the highest level 66. The provision of the jumper 68 makes the stop level number 1 a flow metering level. If jumpers are installed between all of the stop levels 1-5, it will cause all of the pumps to stop at the same low level. These additional jumpers are designated by the numeral 70. The line 72 is the low water alarm level.

To the right of the level scale 60, a select switch 74 is schematically illustrated. This switch provides the operator with the option of operating the station in the standard mode or utilizing the pump running time select feature. The upper block 76 corresponds to the standard mode of operation, while the lower block 78 represents the pump running time select feature.

If the operator selects the standard mode (block 76), the pumps which are selected as lead, lag or standby do the pumping job. If the pump-running time select mode is chosen, the system will cause the pump with the lowest running time to start first, the pump with the next lowest running time to start second, etc. The switch 74 can be a toggle switch or a programmable switch provided on a keypad.

With regard to the block 76, the following points should be made:

In a two-pump system, only A and B would be programmed in. In a five-pump station, pumps A, B, C, D and E are programmed in. If, for example, pump C became defective or were removed for repair, then only pumps A, B, D and E would be programmed in. If the pumps have different capacities, the operator has the option of selecting his preferred pump to be first or last.

If the operator has selected block 76 (assigning various pumps to various levels), he then has the opportunity to select how many pumps will alternate, as represented by the block 80 in FIG. 2. In fact, the operator can decide not to alternate pumps. If he selects the numeral 1, there will be no alternation. If he selects 3, then three pumps (B, C and D) will alternate.

In a five pump pumpstation in which pump C is due for repairs but is still pumping, the operator can select pump C to be level 5, and at the same time alternate between the four remaining pumps by programming in a "four" on the keypad.

The automatic "lowest time" operation represented by the block 78 will now be further clarified.

In this mode, the pump with the lowest time value will start first, and when a second pump is called in then again the pump (of those remaining) with the lowest time value will start, and so on.

When all pumps are running and the level goes down to the point where stop level 1 calls for a pump to stop, then the system will select the pump with the highest running time value to stop first. If the level continues to go down, and the system calls for a further pump to stop, then again the pump with the highest time value (among those still running) will stop, and so on.

These starting and stopping signals go to the time delay section, as represented by the blocks 82 and 84.

Turning now more specifically to the blocks 82 and 84, these allow the operator to select the time (delay) in seconds between the starting and the stopping of the various pumps.

For example, to start the first pump immediately when called for, the operator programs in a zero. If the second pump is called for at the same time, for whatever reason, then the pump selected to be the second pump will start only after a programmed time delay set by the operator. As an example, the operator could program in a time delay of 13 seconds. The remaining pumps would likewise be given time delays for starting, so that every time delay would be different.

The same thing applies to the stopping of the pumps, as indicated in block 84. When all five pumps are running and the first pump is called to stop, the system will stop it immediately if a zero has been programmed in (as illustrated). When the second pump is called to stop at the same time, for whatever reason, then it will stop after a specific time delay that has been programmed in, for example 20 seconds as illustrated in block 84.

Among the reasons which might cause two or more pumps to be called to stop or start at the same time are the following:
the failure or the fouling of level switches;
the failing of level contacts;
the accidental movement of float switches;
the sudden loss of pressure in a bubbler system;
errors in the settings for starting and stopping.

Of course, a general power failure will override the stopping sequence and all pumps will stop.

In order to program the system to cause all pumps to stop at the same low level, the value of zero would be programmed in for the stopping of all pumps.

In FIG. 2, the block 86 merely represents the pump starters.

It is contemplated that the system set forth above could be employed as a total pump station controller. For example, a community might have from ten to fifty pumping stations, and these pumping stations all pump into a single force-main which runs to the treatment plant. In a conventional system, the pumping stations would all start and stop at random, as determined by the inflow into the respective wet wells. It often happens, with a conventional system, that some pumps will start to pump against each other, producing a particularly high back-pressure and a low pump capacity. In the system contemplated herein, a central or master computer would receive all the data from the individual stations, and would schedule the pump cycles at each station to even out the flow as much as possible and reduce to a minimum the overlap of pump cycles. For example, if many stations are predicting the same start time for their emptying cycles, then the central or master computer would start a few pumping stations prematurely to avoid the "rush hour" effect.

While certain aspects of this invention have been illustrated in the accompanying drawings and described hereinabove, it will be evident to those skilled in the art that changes and modifications may be made therein without departing from the essence of this invention, as set forth in the appended claims.

The embodiments of the invention in which an exclusive property or privilege is claimed are defined as follows:

1. In a pumping system which includes a container for liquid, an inlet for the inflow of liquid entering the container, means for ascertaining the liquid level in said container and for generating a first signal corresponding to the current level, a plurality of pumps each having an inlet communicating with the interior of the container and an outlet communicating with a common conduit for liquid being pumped out of the container, and a pump controller for receiving said first signal and for starting and stopping individual pumps,
the improvement comprising:
pressure sensing means in said conduit for sensing the backpressure against which pumps in operation are pumping and for generating a second signal corresponding to said sensed backpressure, the pump controller receiving said second signal,
the provision, operatively connected to the pump controller, of an addressable memory for storing values corresponding to pumping rates vs. backpressure for each of said pumps, along with high and low backpressure values for each pump, and
processor means operatively connected to the pump controller, the processor means being programmed such that:
(a) on high backpressure, the pump controller avoids pumpstarts which will not result in a net increase in the total pumping rate;
(b) on a decrease in backpressure, the pump controller allows more pumps to start when called for, and allows for the starting of more pumps than the minimum necessary, in order to decrease the duration of pumping;
(c) the pump controller avoids a pumpstart under conditions which, given the stored high and low backpressure values for the respective pump, would result in the pump undergoing rapid on/-off cycling;
(d) the pump controller avoids the starting and stopping of pumps on pressure surges, by delaying any action for a given time period longer than the duration of a typical pressure surge.

2. The improvement claimed in claim 1, in which the pumping system is part of a sewage system, and the container is a wet well.

3. The improvement claimed in claim 1, in which the processor means is programmed such that, upon the occurrence of an electric power failure during conditions in which the pump controller would normally require two or more pumps to be running, the pump controller, upon the return of electric power, starts the required pumps in a predetermined sequence rather than simultaneously, with a predetermined time delay between sequential pumpstarts, thereby minimizing electrical current surges and backpressure surges.

4. The improvement claimed in claim 3, in which the pumping system is part of a sewage system, and the container is a wet well.

5. The improvement claimed in claim 1, further comprising:
pump timers operatively connected to the pump controller for continuously storing the total cumulative running time for each of the pumps,
and wherein the processor means is programmed such that, when the pump controller is required to start a pump, it always selects the non-running pump with the least cumulative running time among all of the non-running pumps.

6. The improvement claimed in claim 5, wherein the processor means is programmed such that, when the pump controller is required to stop a pump, it always selects the running pump with the greatest cumulative running time among all of the running pumps.

7. The improvement claimed in claim 6, in which the pumping system is part of a sewage system, and the container is a wet well.

8. The improvement claimed in claim 6, in which the processor means is programmed such that, upon the occurrence of an electric power failure during conditions in which the pump controller would normally require two or more pumps to be running, the pump controller, upon the return of electric power, starts the required pumps in a predetermined sequence rather than simultaneously, with a predetermined time delay between sequential pumpstarts, thereby minimizing electrical current surges and backpressure surges.

9. The improvement claimed in claim 8, in which the pumping system is part of a sewage system, and the container is a wet well.

10. The improvement claimed in any one of claims 1, 2, 5, 6, 7, 3, 4, 8 or 9, in which the pumping system further includes an open channel flowmeter in said inlet, the flowmeter generating a third signal corresponding to the liquid volume inflow to said container, and wherein the processor means is programmed so as to assign, to different levels of said third signal, different empirically calculated average liquid volume inflow rates computed on the basis of:
(a) a known container volume between a lower and an upper level within the container, and
(b) the length of time required for the liquid surface in the container to rise from the lower to the upper level when no pumps are pumping,
the processor means storing such assigned rates in said addressable memory, the processor means further including an extrapolation and interpolation capability whereby, during periods of high inflow when the liquid level remains high despite the running of all pumps, the processor means can estimate inflow on the basis of said third signal and the memorized assigned rates in the addressable memory.

11. A pumping system, comprising:
a container for liquid,
an inlet for the inflow of liquid entering the container,
means for ascertaining the liquid level in said container and for generating a first signal corresponding to the current liquid level,
a conduit for liquid being pumped out of the container,
a plurality of pumps each having an inlet communicating with the interior of the container and an outlet communicating with said conduit,
pressure sensing means in said conduit for sensing the backpressure against which pumps in operation are pumping and for generating a second signal corresponding to said sensed backpressure,
a pump controller for receiving said first and second signals and for starting and stopping individual pumps,
an addressable memory operatively connected to said pump controller, means for storing, in said addressable memory, values corresponding to pumping rates vs. backpressure for each of said pumps, along with high and low backpressure values for each pump, and
processor means operatively connected to the pump controller, the processor means being programmed such that:
(a) on high backpressure, the pump controller avoids pumpstarts which will not result in a net increase in the total pumping rate;
(b) on a decrease in backpressure, the pump controller allows more pumps to start when called for, and allows for the starting of more pumps than the minimum necessary, in order to decrease the duration of pumping;
(c) the pump controller avoids a pumpstart under conditions which, given the stored high and low backpressure values for the respective pump, would result in the pump undergoing rapid on/off cycling;
(d) the pump controller avoids the starting and stopping of pumps on pressure surges, by delaying any action for a given time period which is longer than the duration of a typical pressure surge.

12. The pumping system claimed in claim 11, in which the pumping system is part of a sewage system, and the container is a wet well.

13. The pumping system claimed in claim 3, in which the processor means is programmed such that, upon the occurrence of an electric power failure during conditions in which the pump controller would normally require two or more pumps to be running, the pump controller, upon the return of electric power, starts the required pumps in a predetermined time delay between sequential pumpstarts, thereby minimizing electrical current surges and backpressure surges.

14. The pumping claimed in claim 13, in which the pumping system is part of a sewage system, and the container is a wet well.

15. The pumping system claimed in claim 11, further comprising:
pump timers operatively connected to the pump controller for continuously storing the total cumulative running time for each of the pumps,
and wherein the processor means is programmed such that, when the pump controller is required to start a pump, it always selects the non-running pump with the least cumulative running time among all of the non-running pumps.

16. The pumping system claimed in claim 15, in which the processor means is programmed such that, upon the occurrence of an electric power failure during conditions in which the pump controller would normally require two or more pumps to be running, the pump controller, upon the return of electric power, starts the required pumps in a predetermined sequence rather than simultaneously, with a predetermined time delay between sequential pumpstarts, thereby minimizing electrical current surges and backpressure surges.

17. The pumping system claimed in claim 16, in which the pumping system is part of a sewage system, and the container is a wet well.

18. The pumping system claimed in claim 15, wherein the processor means is programmed such that, when the pump controller is required to stop a pump, it always selects the running pump with the greatest cumulative running time among all of the running pumps.

19. The pumping claimed in claim 18, in which the pumping system is part of a sewage system, and the container is a wet well.

20. The pumping system claimed in any one of claims 11, 12, 15, 18, 19, 13, 14, 16 or 17, in which the pumping system further includes an open channel flowmeter in said inlet, the flowmeter generating a third signal corresponding to the liquid volume inflow to said container, and wherein the processor means is programmed so as to assign, to different levels of said third signal, different empirically calculated average liquid volume inflow rates computed on the basis of:
(a) a known container volume between a lower and an upper level within the container, and
(b) the length of time required for the liquid surface in the container to rise from the lower to the upper level when no pumps are pumping,
the processor means storing such assigned rates in said addressable memory, the processor means further including an extrapolation and interpolation capability whereby, during periods of high inflow when the liquid level remains high despite the running of all pumps, the processor means can estimate inflow on the basis of said third signal and the memorized assigned rates in the addressable memory.

21. A pumping system, comprising:
a container for liquid,
an inlet for the inflow of liquid entering the container,
means for ascertaining the liquid level in said container and for generating a signal corresponding to the current liquid level,
a conduit for liquid being pumped out of the container,
a plurality of pumps each having an inlet communicating with the interior of the container and an outlet communicating with said conduit,
a pump controller for receiving said signal and for starting and stopping individual pumps so as to maintain the liquid level between predetermined upper and lower limits,
an open channel flowmeter in said inlet, the flowmeter generating a further signal corresponding to the liquid volume inflow the said container,
a processor means operatively connected to said pump controller,
an addressable memory operatively connected to said pump controller,
the processor means being programmed so as to assign, to different levels of said further signal, different empirically calculated average liquid volume inflow rates computed on the basis of:
(a) a known container volume between a lower and an upper level within the container, and
(b) the length of time required for the liquid surface in the container to rise from the lower to the upper level when no pumps are pumping,
the processor means storing such assigned rates in said addressable memory, the processor means further including an extrapolation and interpolation capability whereby, during periods of high inflow when the liquid level remains high despite the running of all pumps, the processor means can estimate inflow on the basis of said third signal and the memorized assigned rates in the addressable memory.

22. The pumping system claimed in claim 21, in which the pumping system is part of a sewage system, and the container is a wet well.

* * * * *